(12) United States Patent
Samadani

(10) Patent No.: US 7,684,632 B2
(45) Date of Patent: Mar. 23, 2010

(54) ESTIMATING IMAGE COMPRESSION QUANTIZATION PARAMETER VALUES

(75) Inventor: Ramin Samadani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 976 days.

(21) Appl. No.: 11/129,924

(22) Filed: May 16, 2005

(65) Prior Publication Data

US 2006/0257037 A1    Nov. 16, 2006

(51) Int. Cl.
G06K 9/00    (2006.01)
(52) U.S. Cl. ........................ 382/251; 382/239
(58) Field of Classification Search ............. 382/250, 382/232, 172, 236, 280, 248, 251; 348/222.1, 348/312
See application file for complete search history.

(56) References Cited

U.S. PATENT DOCUMENTS

| 5,396,567 | A  | * | 3/1995  | Jass .............................. 382/251 |
| 5,649,151 | A  |   | 7/1997  | Chu et al. |
| 5,734,755 | A  | * | 3/1998  | Ramchandran et al. ...... 382/250 |
| 5,740,283 | A  | * | 4/1998  | Meeker ........................ 382/248 |
| 5,974,471 | A  |   | 10/1999 | Belt |
| 6,310,974 | B1 | * | 10/2001 | Persiantsev et al. .......... 382/232 |
| 6,310,979 | B1 | * | 10/2001 | Persiantsev et al. .......... 382/236 |
| 6,473,533 | B1 | * | 10/2002 | Yokose et al. ................ 382/248 |
| 6,650,784 | B2 | * | 11/2003 | Thyagarajan ................ 382/244 |
| 6,760,482 | B1 | * | 7/2004  | Taubman ..................... 382/240 |
| 6,782,133 | B2 | * | 8/2004  | Yokose et al. ................ 382/232 |
| 7,116,830 | B2 | * | 10/2006 | Srinivasan ................... 382/236 |
| 7,444,030 | B2 | * | 10/2008 | Reid et al. ................... 382/239 |
| 2002/0164081 | A1 | * | 11/2002 | Zhou .......................... 382/250 |
| 2004/0119840 | A1 | * | 6/2004  | Ishihara et al. ............ 348/222.1 |
| 2005/0078872 | A1 | * | 4/2005  | Samadani et al. ............ 382/233 |
| 2008/0131014 | A1 | * | 6/2008  | Lee et al. ..................... 382/251 |
| 2008/0205516 | A1 | * | 8/2008  | Song et al. ............. 375/240.03 |

FOREIGN PATENT DOCUMENTS

WO    WO98/40842    *    9/1998

OTHER PUBLICATIONS

Edmund Y. Lam "Compound document compression with model-based biased reconstruction"Journal of Electronic Imaging 13(1), 191-194 (Jan. 2004), p. 1-7.*

Alireza Zolghadr-E-Asli, Siamak Alipour An effective method for still image compression/decompression for transmission on PSTN lines based on modifications of Huffman coding Computers and Electrical Engineering 30 (2004) 129-145, p. 1-17.*

(Continued)

*Primary Examiner*—Brian Q Le
*Assistant Examiner*—Mekonen Bekele

(57) ABSTRACT

Methods, machines, systems and machine-readable instructions for processing an image are described. In one aspect, the image is divided into a population of image blocks. Frequency domain vectors are generated from respective ones of the image blocks. Each of the frequency domain vectors includes a respective set of values corresponding to a set of transform coefficients. Preliminary estimates of quantization parameter values are determined from frequency distributions of the transform coefficient values in a set of the frequency domain vectors corresponding to a variable sample of the population. The variable sample is determined at least in part by at least one threshold. Values of quantization parameters are estimated from the preliminary estimates.

34 Claims, 6 Drawing Sheets

OTHER PUBLICATIONS

Khalid Sayood "A Nearly Lossless Vector Quantization Algorithm for Compression of Remotely Sensed Images" IEEE,1998, p. 1247-1250.*

Deepak S. Turaga, Yingwei Chen, Jorge Caviedes, "No reference PSNR estimation for compressed pictures", Signal Processing: Image Communication vol. 19, Issue 2, Feb. 2004, pp. 173-184.*

Zhigang Fan and Ricardo L. de Queiroz,"Identification of Bitmap Compression History: JPEG Detection and Quantizer Estimation", IEEE Transactions on Image Processing, vol. 12, No. 2, Feb. 2003, pp. 230-235.*

Zhigang Fan et al., "Identification of bitmap compression history: JPEG detection and quantizer estimation," IEEE Trans. Image Processing, vol. 12, No. 2 (Feb. 2003).

Jessica Fridrich et al., "Steganalysis based on JPEG compatibility," A. Tescher, B. Vasudev, & V. M. Bove, Jr. (Ed.) Proc. SPIE vol. 4518 (2001).

Ramesh Neelamani et al., "JPEG compression history estimation for color images," IEEE International Conference on Image Processing—ICIP-2003 (Sep. 2003).

* cited by examiner

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

80 ↘

Value Buffer — 82

| V0 | V1 | V2 | V3 | V4 | V5 |

Count Buffer — 84

| N0 | N1 | N2 | N3 | N4 | N5 |

100 ↘

Value Buffer

| V0=0 | V1=1 | V2=2 | V3 | V4 | V5 |

Count Buffer

| N0 | N1 | N2 | N3 | N4 | N5 |

ESTIMATING IMAGE COMPRESSION QUANTIZATION PARAMETER VALUES

BACKGROUND

Digital images and video frames are compressed in order to reduce data storage and transmission requirements. In most image compression methods, certain image data is discarded selectively to reduce the amount of data needed to represent the image while avoiding substantial degradation of the appearance of the image.

Transform coding is a common image compression method that involves representing an image by a set of transform coefficients. The transform coefficients are quantized individually to reduce the amount of data that is needed to represent the image. A representation of the original image is generated by applying an inverse transform to the transform coefficients. Block transform coding is a common type of transform coding method. In a typical block transform coding process, an image is divided into small, non-overlapping rectangular regions (or "blocks"), which are subjected to forward transform, quantization and coding operations.

FIG. 1 shows a prior art method of compressing an image 10 in accordance with the JPEG compression format. In this method, if the original image 10 is not already specified in a preselected color space (e.g., the YCrCb color space), the original image 10 is converted into the preselected luminance-based color space (block 12). Each color plane of the image in the preselected color space corresponds to a respective image (i.e., an array of pixel values) that is processed individually as follows. The color components (e.g., the Cr and Cb color components) are downsampled (block 14). Each color plane is divided into blocks of pixels (e.g., 8×8 pixel blocks) (block 16). A DCT block transform is applied to each pixel block individually (block 18). The resulting DCT coefficients are quantized (block 20). In this process, the DCT coefficients are quantized to the closest integer multiples of the quantization parameter values corresponding to the frequencies of the DCT coefficients. That is, a quantized transform coefficient $\bar{c}_{ij}$ for a block is given by:

$$\bar{c}_{ij} = \text{round}\left(\frac{c_{ij}}{q_{ij}}\right) \quad (1)$$

where $c_{ij}$ is the (i,j) transform coefficient and $q_{ij}$ is the quantization parameter corresponding to the transform coefficient $c_{ij}$. The quantized transform coefficients are encoded using a lossless coding technique to produce a compressed image 22 (block 24).

FIG. 2 shows a prior art method of decompressing the compressed image 22. In this method, the compressed image data is losslessly decoded (block 26). The resulting quantized transform coefficients are dequantized (block 28). These dequantized coefficients $\hat{c}_{ij}$ are given by:

$$\hat{c}_{ij} = q_{ij} \bar{c}_{ij} \quad (2)$$

An inverse DCT block transform is applied to each of the dequantized transform coefficients (block 30). The resulting image blocks are assembled into the constituent color planes of the image (block 32). The color components (e.g., the Cr and Cb color components) are upsampled (block 34). If the image is not is already specified in the final color space (e.g., the RGB color space), the resulting image is converted from the preselected luminance-based color space (e.g., the YCrCb color space) to the final color space to produce the decompressed image 36 (block 38). The values of the original quantization parameters ($q_{ij}$) that were used to compress an image may be used in a variety of ways. For example, the quality of an image often is degraded by a block transform coding process, which may introduce discontinuities at the block boundaries in the reconstructed image and may introduce ringing artifacts near image boundaries. Many artifact reduction methods rely on the original values of the quantization parameters that were used to compress the images in order to reduce the appearance of artifacts that were introduced by block transform coding processes. The original quantization parameters also may be used to recompress an image without introducing additional compression artifacts into the image.

The JPEG compression standard allows the original quantization parameter values that were used to compress an image to be stored in the compressed image file. Many other image formats (e.g., a bitmap format, such as BMP), however, do not retain information about the quantization parameter values. As a result, information about the original quantization parameter values typically is lost in the process of decompressing JPEG images into other formats.

Different methods have been proposed for estimating the original quantization parameter values from a decompressed bitmap image. In general, these methods involve dividing the image into blocks, computing forward transforms of the image blocks, and, after the entire image has been processed, estimating the quantization parameter values based on histograms of the values of the forward transform coefficients in the image blocks. In some approaches, an optimization process (e.g., a maximum likelihood estimation process) is performed to evaluate likelihood functions that compute quantization parameter values by fitting the forward transform coefficient values to a model of the probability distribution function of the forward transform coefficient values.

Although the above-described methods are capable of obtaining estimates of the quantization parameter values, these methods are computationally intensive and require significant memory resources. For example, many of these methods process an entire image before the quantization parameter values are estimated and, therefore, the processing requirements increase with image size. These methods also store the histograms of coefficient values for each of the transform coefficients and, therefore, these methods require significant memory resources. In addition, the optimization processes that are performed by these methods are computationally intensive and therefore are not suitable in application environments, such as embedded environments, in which processing and memory resources are significantly constrained.

SUMMARY

In one aspect, the invention features a method of processing an image. In accordance with this method, the image is divided into a population of image blocks. Frequency domain vectors are generated from respective ones of the image blocks. Each of the frequency domain vectors comprises a respective set of values corresponding to a set of transform coefficients. Preliminary estimates of quantization parameter values are determined from frequency distributions of the transform coefficient values in a set of the frequency domain vectors corresponding to a variable sample of the population. The variable sample is determined at least in part by at least one threshold. Values of quantization parameters are estimated from the preliminary estimates.

The invention also features a machine, a system, and machine-readable instructions for implementing the above-described image processing method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale. Elements shown with dashed lines are optional elements in the illustrated embodiments incorporating such elements.

I. OVERVIEW

The embodiments that are described in detail below leverage an understanding of the clustering behavior of transform coefficient values derived from samples of image blocks to reduce the computational resources and memory resources that are needed to estimate quantization parameter values. In some implementations, these embodiments estimate quantization parameter values based on a relatively small sample of a population of image blocks that are divided from an image. In addition, some implementations are able to extrapolate quantization parameter values based on identification of a corresponding reference set of quantization parameter values. In this way, these implementations additionally reduce the required computational and memory resource requirements. Due to their efficient use of processing and memory resources, these embodiments readily may be implemented in application environments, such as embedded environments, which are subject to significant processing and memory constraints.

Figure 1:
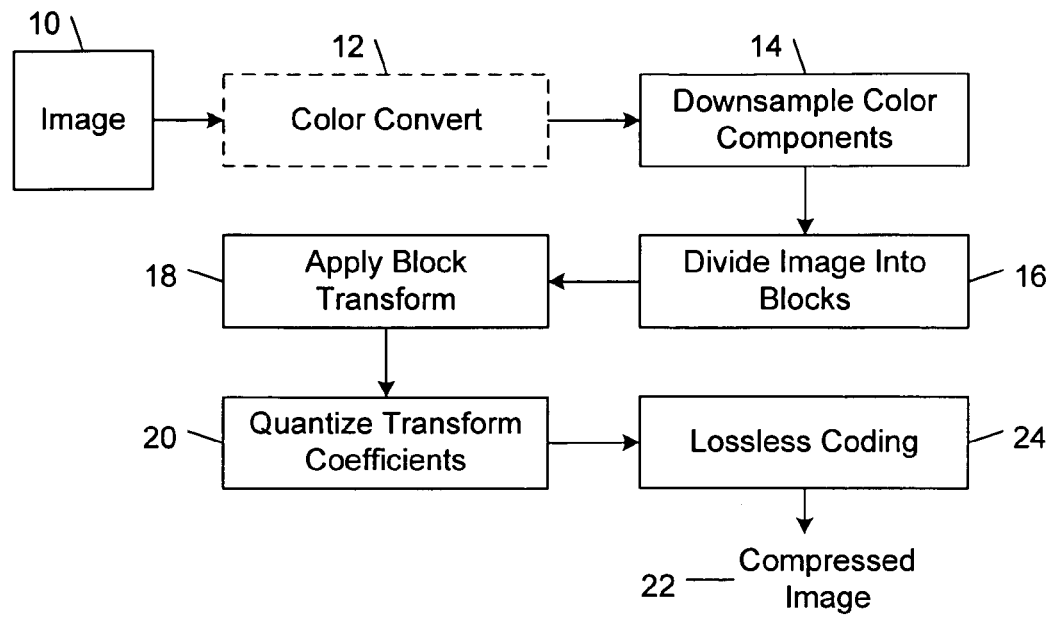
FIG. 1 is a flow diagram of a prior art JPEG image compression process.
Figure 2:
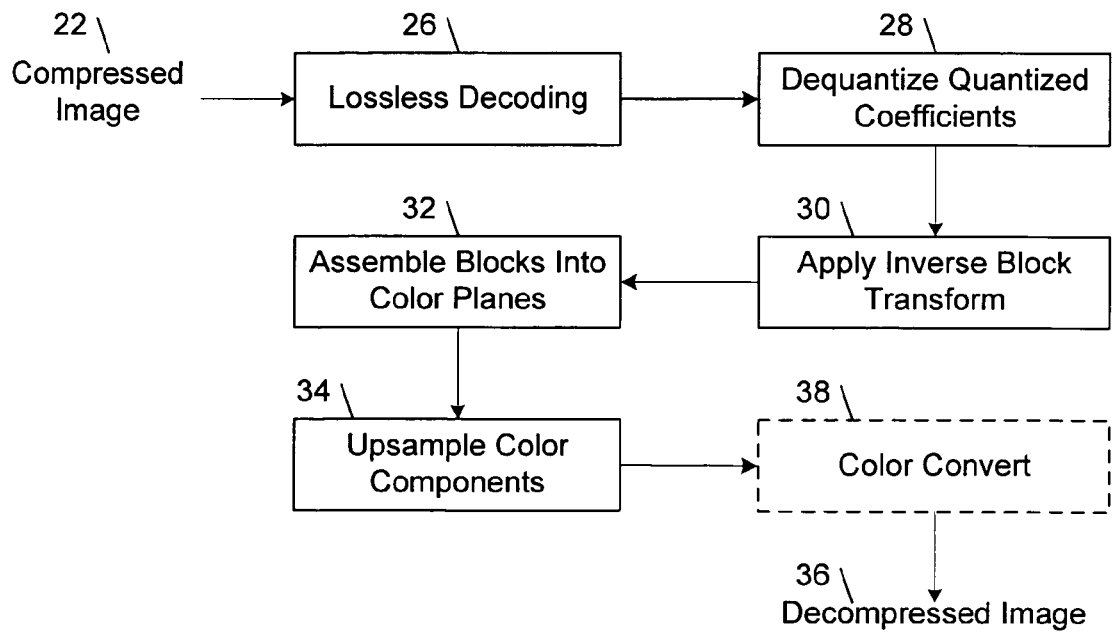
FIG. 2 is a flow diagram of a prior art process for decompressing a JPEG image.
Figure 3:
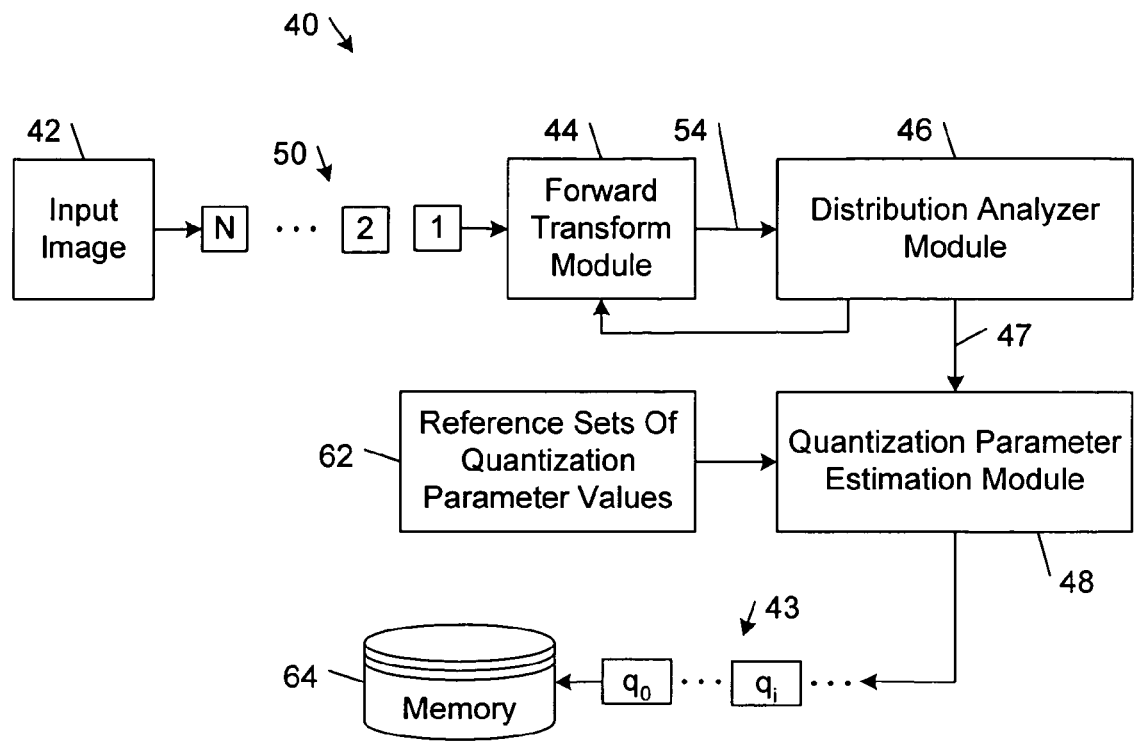
FIG. 3 is a block diagram of an embodiment of an image processing system for estimating quantization parameter values.

FIG. 3 shows an embodiment of a system 40 for processing an input image 42 to obtain estimates 43 of quantization parameter values that were used to compress an original image from which the input image 42 was derived.

The image processing system 40 includes a forward transform module 44, a distribution analyzer module 46, and a quantization parameter estimator module 48. In general, the modules 44-48 of the image processing system 40 are not limited to any particular hardware or software configuration, but rather they may be implemented in any computing or processing environment, including in digital electronic circuitry or in computer hardware, firmware, device driver, or software. For example, in some implementations, these modules 44-48 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

Computer process instructions for implementing the forward transform module 44, the distribution analyzer module 46, and the quantization parameter estimator module 48 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

The input image 42 may be, for example, a multilevel single-color image (e.g., a gray-level image), or a multilevel multi-color image. In general, the image processing system 40 processes each color plane of the input image 42 individually. In the illustrated embodiment, the input image 42 corresponds to a decompressed version of an original image that was compressed in accordance with a block transform compression process in which the blocks of the original image were quantized using quantization parameters with respective values. As explained in detail below, the image processing system 40 estimates these quantization parameter values based on a frequency domain analysis of the input image 42.

Figure 4:
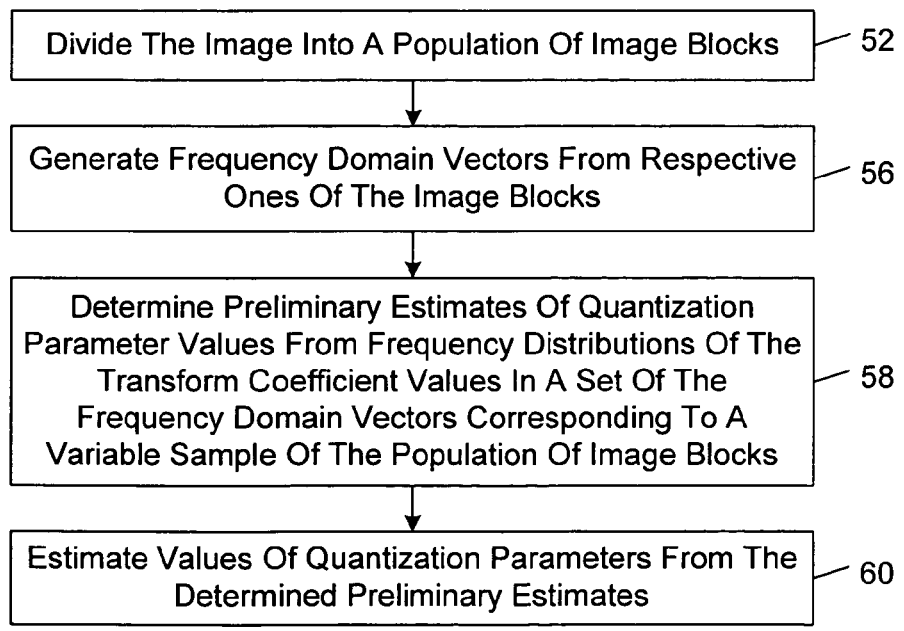
FIG. 4 is a flow diagram of an embodiment of a method of estimating quantization parameter values.

FIG. 4 shows an embodiment of a method accordance with which the image processing system 40 processes the input image 42. In this embodiment, the input image 42 is divided into a population of N image blocks 50, where N has a positive integer value (block 52). In some implementations, the input image 42 is decomposed into image blocks of 8×8 pixels by a raster-to-block converter, which may or may not be incorporated within the image processing system 40.

The forward transform module 44 generates frequency domain vectors 54 from respective ones of the image blocks 50 (block 56). Each frequency domain vector 54 contains a respective set of transform coefficients that is derived from a respective one of the image blocks 50. The frequency domain vectors correspond to the spatial frequency information in the input image. The coefficients of the frequency domain vectors 54 are computed, for separable two-dimensional transforms, by applying a frequency-domain transform D to the image blocks 50 in the variable sample as follows:

$$C = DXD^T \quad (3)$$

where X corresponds to a two dimensional image block 50, $D^T$ corresponds to the transpose of transform D, and C corresponds to the transform coefficients of the image block X that form the frequency domain vector 54.

In general, the forward transform module 44 may apply any kind of block transform to the image blocks 50. Exemplary types of block transforms include the cosine transform, Fourier transform, Hadamard transform, and Haar wavelet transform. In many implementations, the two dimensional transforms are separable, and D represents a one dimensional block-based linear transform from which the two dimensional transforms are constructed. A common example is the discrete cosine transform (DCT). In one dimension, the DCT transform is given to four decimal places by the following 8×8 matrix:

$$D = \begin{bmatrix} 0.3536 & 0.3536 & 0.3536 & 0.3536 & 0.3536 & 0.3536 & 0.3536 & 0.3536 \\ 0.4904 & 0.4157 & 0.2778 & 0.0975 & -0.0975 & -0.2778 & -0.4157 & -0.4904 \\ 0.4619 & 0.1913 & -0.1913 & -0.4619 & -0.4619 & -0.1913 & 0.1913 & 0.4619 \\ 0.4157 & -0.0975 & -0.4904 & -0.2778 & 0.2778 & 0.4904 & 0.0975 & -0.4157 \\ 0.3536 & -0.3536 & -0.3536 & 0.3536 & 0.3536 & -0.3536 & -0.3536 & 0.3536 \\ 0.2778 & -0.4904 & 0.0975 & 0.4157 & -0.4157 & -0.0975 & 0.4904 & -0.2778 \\ 0.1913 & -0.4619 & 0.4619 & -0.1913 & -0.1913 & 0.4619 & -0.4619 & 0.1913 \\ 0.0975 & -0.2778 & 0.4157 & -0.4904 & 0.4904 & -0.4157 & 0.2778 & -0.0975 \end{bmatrix} \quad (4)$$

In some other implementations, D is a wavelet-based decomposition transform. In one of these implementations, for example, D is a forward discrete wavelet transform (DWT) that decomposes a one-dimensional (1-D) sequence (e.g., line of an image) into two sequences (called sub-bands), each with half the number of samples. In this implementation, the 1-D sequence may be decomposed according to the following procedure: the 1-D sequence is separately low-pass and high-pass filtered by an analysis filter bank; and the filtered signals are downsampled by a factor of two to form the low-pass and high-pass sub-bands.

Figures 5, 6A, 6B, 6C:
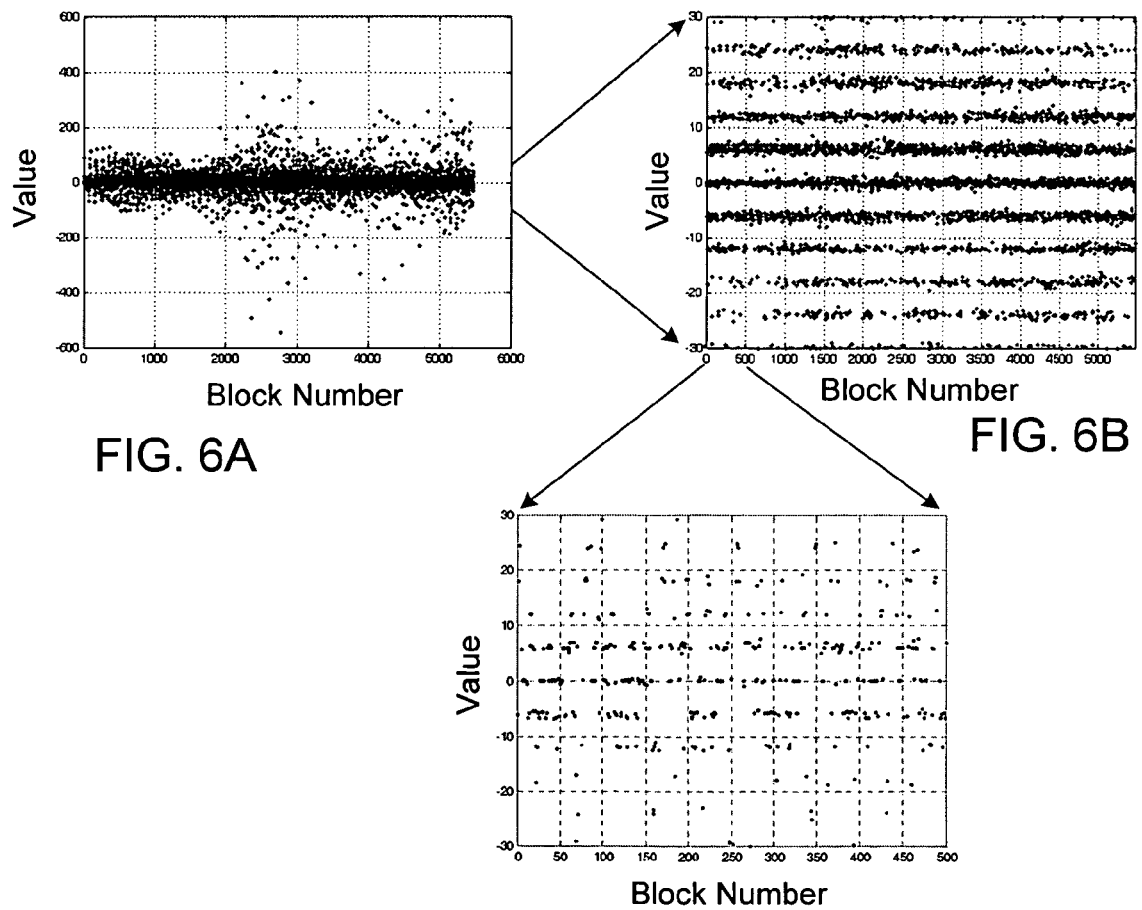
FIG. 5 shows a matrix containing a typical zigzag ordering of the 64 DCT coefficients for an image block in accordance with the JPEG image compression format.
FIG. 6A shows a graph of values generated for a given transform coefficient from a population of blocks of an image plotted as a function of image block number.
FIG. 6B shows an enlarged horizontal slice of the graph shown in FIG. 6A.
FIG. 6C shows an enlarged vertical slice of the graph shown in FIG. 6B.

In some implementations, each of the frequency domain vectors 54 contains sixty-four coefficients $\hat{c}_i$ (i=0, 1, . . . , 63) that are organized into the zigzag sequence shown in FIG. 5, where the number in each box corresponds to the index number (i-value) of the coefficient. These one-dimensionally indexed coefficients $\hat{c}_i$ correspond to the two dimensionally indexed $\hat{c}_{ij}$ of equation (2). In these embodiments, the index number 0 corresponds to the DC coefficient and the remaining index numbers (1-63) correspond to the AC coefficients, which are ordered from the lowest AC spatial frequency (i=1) to the highest AC spatial frequency (i=63).

The distribution analyzer module 46 determines preliminary estimates 47 of quantization parameter values from frequency distributions of the transform coefficient values in a set of the frequency domain vectors 54 corresponding to a variable sample of the population of image blocks 50 (block 58). The frequency distributions of the transform coefficients refer to relative counts or number of occurrences of values in a sample of a particular transform coefficient. As explained in detail below, the variable sample is determined at least in part by at least one threshold.

The quantization parameter estimator module 48 estimates values of the quantization parameters from the preliminary estimates 47 that are determined by the distribution analyzer module 46 (block 60). As explained in detail below, in some implementations, the quantization parameter estimator module 48 selects one of multiple reference sets 62 of quantization parameter values based on the preliminary quantization value estimates. In these implementations, the quantization parameter estimator module 48 extrapolates estimates of values for the quantization parameters based on the selected reference set 62 of quantization parameter values.

The resulting estimates 43 of quantization parameter values may be stored in a memory 64. Storage devices suitable for storing the quantization parameter value estimates include all forms of non-volatile memory, including, for example, semiconductor memory devices, such as EPROM, EEPROM, and flash memory devices, magnetic disks such as internal hard disks and removable disks, magneto-optical disks, and CD-ROM.

II. DETERMINING PRELIMINARY ESTIMATES OF QUANTIZATION PARAMETER VALUES

For most images, the frequency distributions for the values of respective ones of the transform coefficients exhibit peaks at or near values corresponding to integer multiples of the corresponding quantization parameter values. For example, if an original image were subjected to quantization with a quantization parameter value of 10 for a given one of the transform coefficients, the quantization parameter values derived from the decompressed version of the compressed image for the given transform coefficient would have a frequency distribution with peaks at values corresponding to integer multiples of 10.

FIG. 6A shows a graph of the values generated for a given transform coefficient from a population of blocks of an image. The values are plotted as a function of image block number. FIG. 6B shows an enlarged horizontal slice of the graph shown in FIG. 6A, and FIG. 6C shows an enlarged vertical slice of the graph shown in FIG. 6B. As shown in FIG. 6B, the transform coefficient values form horizontal clusters at multiples of the corresponding quantization parameter value. The periodicity of these clusters is evident from an analysis of only a small range of the transform coefficient values. The distribution analyzer module 46 leverages this fact to limit the number of these horizontal clusters that are considered in the determination of the preliminary estimates of the values of the quantization parameters. As shown in FIG. 6C, the periodicity of the transform coefficient value clusters is evident from an analysis of only a small sample of the total population of image blocks that are divided from the input image 42. The distribution analyzer module 46 leverages this fact to limit the number of image blocks that are considered in the determination of the preliminary estimates of the values of the quantization parameters.

Figure 7:
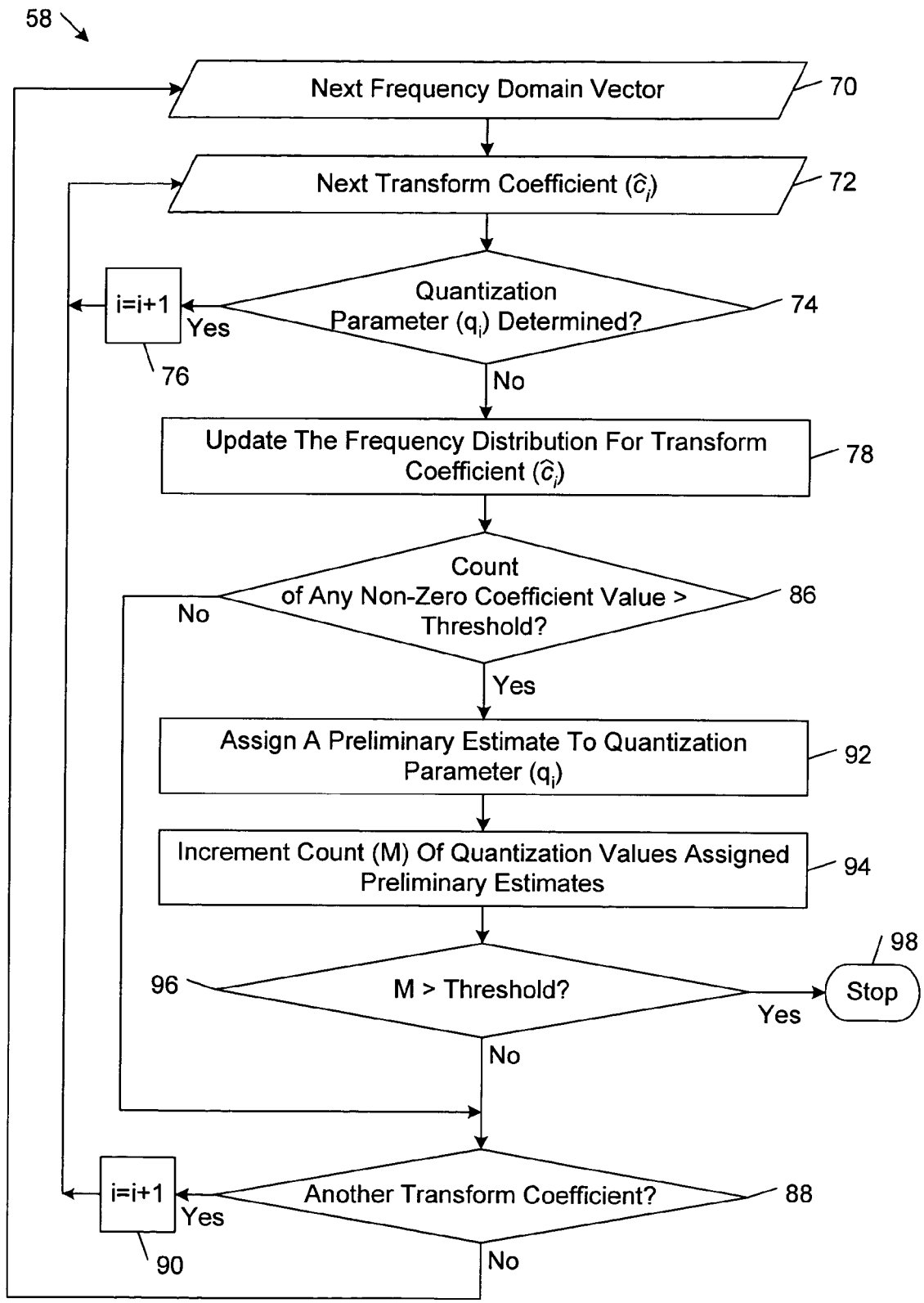
FIG. 7 is a flow diagram of an embodiment of a method of analyzing distributions of transform coefficient values.

FIG. 7 shows an embodiment of a method by which the distribution analyzer module 46 determines preliminary estimates of quantization parameter values (block 58; FIG. 4). In accordance with this method, the distribution is analyzer module 46 sequentially processes the frequency domain vectors 54 that are generated by the forward transform module 44 (block 70). The distribution analyzer module 46 also sequentially processes the transform coefficient values in each of the frequency domain vectors 54 being processed (block 72).

The distribution analyzer module 46 determines whether a preliminary estimate already has been determined for the quantization parameter ($q_i$) that corresponds to the current transform coefficient ($\hat{c}_i$) (block 74). If a preliminary estimate has been determined for the quantization parameter ($q_i$), the index i is incremented (block 76) and the next transform coefficient is processed (block 72). Otherwise, the frequency distribution for the current transform coefficient ($\hat{c}_i$) is updated (block 78). In this process, the distribution analyzer module 46 does not maintain a histogram or frequency distribution of all of the values of the current transform coefficient ($\hat{c}_i$) that are observed in the processed ones of the frequency domain vectors 54. Instead, the distribution analyzer module 46 dynamically tracks the frequency distribution of only a subset of the possible values of the observed transform coefficient values. For this reason, the frequency distributions maintained by the distribution analyzer module 46 may be referred to as sparse count distributions. By tracking only a fraction of the total number of values for each coefficient, the distribution analyzer module 46 reduces the processing and memory resources that are needed to determine the preliminary estimates of the quantization parameter values.

Figures 8, 9, 10:
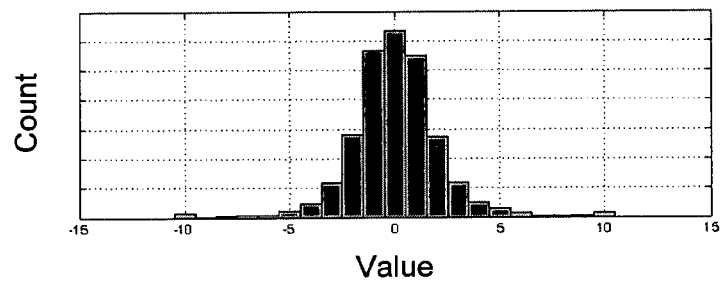
FIG. 8 shows an embodiment of a data structure for analyzing distributions of transform coefficient values.
FIG. 9 is a histogram of transform coefficient values in which there is no periodicity from which a quantization parameter value may be estimated.
FIG. 10 shows an embodiment of a data structure for analyzing distributions of transform coefficient values.

In some implementations, the distribution analyzer module 46 tracks respective sets of maxima in the frequency distributions for the transform coefficients or the sparse count distribution. Referring to FIG. 8, in some of these implementations, the distribution analyzer module 46 tracks each set of the maxima using a respective sparse data structure 80. The sparse data structure 80 includes a value buffer 82 and a count buffer 84. The value buffer 82 contains a set of transform coefficient values (V0, V1, . . . , V5) whose frequencies (or counts) are being tracked in respective cells (N0, N1, . . . , N5) of the count buffer 84. In the illustrated embodiment, the value buffer 82 and the count buffer 84 of the sparse data structure 80 each includes six cells for tracking six different transform coefficient values. In other implementations, each of the value buffer 82 and the count buffer 84 may include a number of cells that is greater than or less than six. In general, the number of cells in the value buffer 82 and the count buffer 84 may be determined empirically.

In operation, the distribution analyzer module 46 updates the sparse count distribution for a given transform coefficient ($\hat{c}_i$) by considering the corresponding current value in the current frequency domain vector. If the current value appears in the value buffer 82, the distribution analyzer module 46 increments the corresponding cell in the count buffer 84. If the current value is not in the value buffer 82 and the value buffer 82 is not full, the distribution analyzer module 46 enters the value in an empty one of the value buffer cells and increments the corresponding count cell. If the current value is not in the value buffer 82 and the value buffer 82 is full of entries, the distribution analyzer module 46 (1) replaces the value in the value buffer cell that is associated with the lowest count, (2) inserts in its place the current transform coefficient value, and (3) sets the corresponding count buffer cell to 1. In practice, repeated iteration of this process typically results in the tracking of the maximum non-zero value in the frequency distribution of the current transform coefficient ($\hat{c}_i$).

After the frequency distribution for the current transform coefficient ($\hat{c}_i$) has been updated (block 78), the distribution analyzer module 46 determines whether the frequency (or count) of any of the non-zero coefficient values in the sparse data structure 80 exceeds a threshold (block 86). The threshold may be determined empirically. If the frequency of one of the non-zero coefficient values does not exceed the threshold (block 86), the distribution analyzer module 46 determines whether there is another transform coefficient to process (block 88). If there is another transform coefficient to process, the distribution analyzer module 46 increments the index i (block 90) and processes the next transform coefficient (block 72). Otherwise, the distribution analyzer module 46 processes the next frequency domain vector (block 70).

If the frequency of one of the non-zero coefficient values exceeds the threshold (block 86), the distribution analyzer module 46 assigns to the quantization parameter value $q_i$ a preliminary estimate corresponding to the value of the highest-frequency non-zero transform coefficient value in the sparse data structure 80 (block 92). The distribution analyzer module 46 also increments the count (M) of the quantization parameters that are assigned preliminary estimates (block 94).

If the count (M) of the quantization parameters that are assigned preliminary estimates exceeds an empirically determined threshold (block 96), the distribution analyzer module 46 stops the analysis of the distributions of transform coefficient values (block 98). The distribution analyzer module 46 also transmits a command to the forward transform module 44 that terminates the generation of the frequency domain vectors 54.

If the count (M) of the quantization parameters that are assigned preliminary estimates does not exceed the threshold (block 96), the distribution analyzer module 46 determines whether there is another transform coefficient to process (block 88). If there is another transform coefficient to process, the distribution analyzer module 46 increments the index i (block 90) and processes the next transform coefficient (block 72). Otherwise, the distribution analyzer module 46 processes the next frequency domain vector (block 70).

In the ideal case, each of the quantized transform coefficients would have values only at multiples of the corresponding quantization parameter value. In practice, however, noise due to digital processing (e.g., errors in color conversion) causes the quantized transform coefficients to show some spread around the multiples of the true quantization parameter values. This phenomenon becomes more problematic when the quantization parameters values to be estimated are small (e.g., values of 1 or 2) and the original image has high spatial frequency content. FIG. 9 shows histogram for a selected transform coefficient that was quantized with a quantization parameter value equal to 1. In this exemplary illustration, the transform coefficient values do not exhibit any discernible periodic clustering.

Referring to FIG. 10, in some implementations, the distribution analyzer module 46 is able to determine preliminary quantization parameter value estimates from frequency distributions of the type shown in FIG. 10 as follows. In these implementations, the distribution analyzer module 46 tracks transform coefficient value frequencies using a sparse data structure 100. The sparse data structure 100 corresponds to the sparse data structure 80 except that the sparse data structure 100 explicitly tracks the frequencies of transform coefficient values near zero. In the illustrated embodiment, the sparse data structure 100 tracks the frequencies of transform coefficient values 0, 1, and 2. The remaining value buffer cells (i.e., cells V3, V4, and V5) may take on values in accordance with the process described above in connection with the sparse data structure 80. In these implementations, instead of assigning the highest-frequency transform coefficient value as the preliminary estimate, the distribution analyzer module 46 implements a decision rule based on the relative counts for the transform coefficient values 0, 1, and 2. In this process, the distribution analyzer module 46 takes into account an implicit model of the fall-off of the transform coefficient values in the vicinity of 0.

In one implementation, the distribution analyzer module 46 implements the following decision rule to select the preliminary estimate of the quantization parameter based on the sparse data structure 100.

```
If (count(2) > count(0)
{
    if (count(2) > count(1))
    {
        q_estimate = 2;
    }
    else
    {
        q_estimate = 1;
    }
}
``` where count(0), count(1) and count(2) are the counts of the absolute values of a given transform coefficient near the transform coefficient value 0, and q_estimate is the preliminary estimate that is assigned to the corresponding quantization parameter. The requirement that count(2)>count(0) is what makes this process different from the process described above in which the highest-frequency non-zero transform coefficient value is selected as the preliminary estimate. For example, count(1)>count(0) could happen, but if count(2) ≦count(0) then the distribution analyzer module 46 will not select 1 or 2 as the preliminary quantization parameter value estimate. Instead, the distribution analyzer module 46 will select the highest-frequency non-zero parameter value in value buffer cells V3, V4, V5 as the preliminary quantization parameter value estimate.

Figure 11:
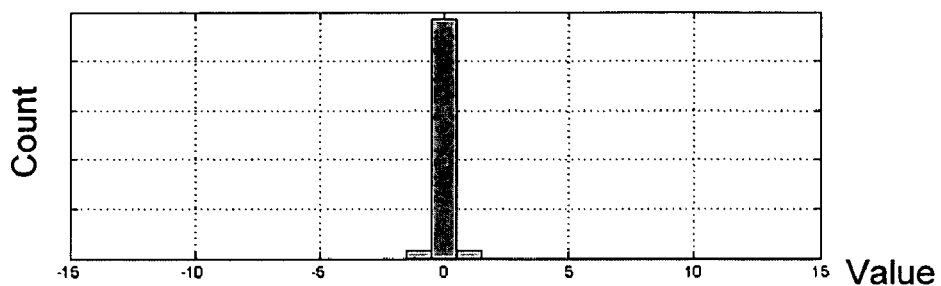
FIG. 11 is a histogram of transform coefficient values in which the transform coefficient values have been quantized to zero.

In some cases, the frequency domain characteristics of the input image 42 prevent the distribution analyzer module 46 from determining preliminary estimates for at least some of the quantization parameters. FIG. 11 shows a histogram for a selected transform coefficient in which all of the values have been quantized to zero. This often occurs for high-frequency transform coefficients that are quantized with high quantization parameter values. In this case, there is insufficient information to determine a preliminary estimate for the quantization parameter value. Values for quantization parameters corresponding to transform coefficients exhibiting these types of frequency distributions still may be estimated by the quantization parameter estimation module 48 based on the preliminary estimates that are determined by the distribution analyzer module 46.

III. ESTIMATING QUANTIZATION PARAMETER VALUES

As explained above, the quantization parameter estimator module 48 estimates values of the quantization parameters from the preliminary estimates determined by the distribution analyzer module 46 (block 60; FIG. 4).

Figure 12:
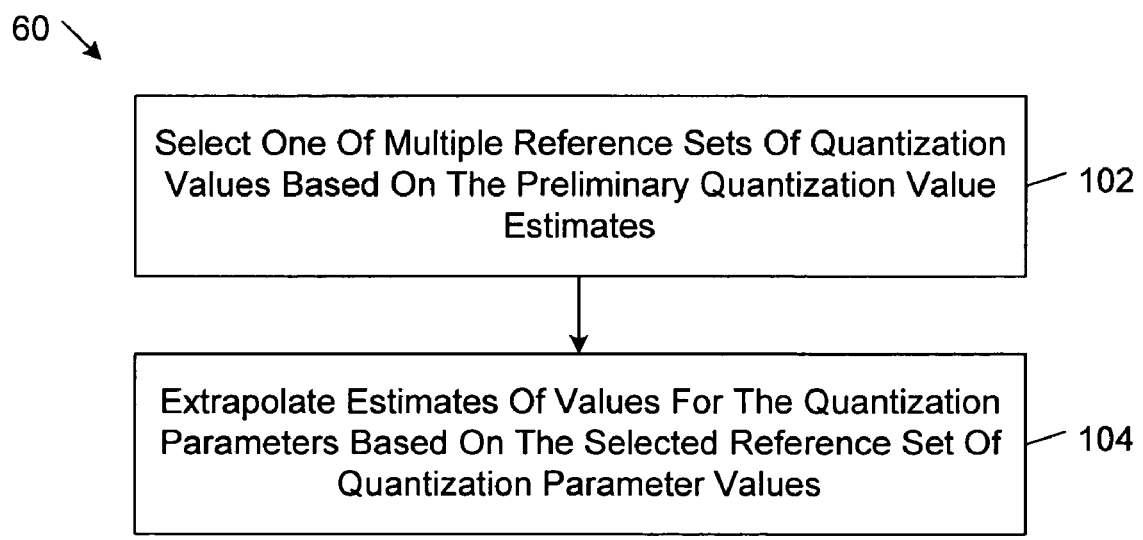
FIG. 12 is a flow diagram of an embodiment of a method of estimating quantization parameter values from preliminary estimates of quantization parameter values that are determined in accordance with the method of FIG. 7.

FIG. 12 shows an embodiment of a method by which the quantization parameter estimator module 48 estimates the values of the quantization parameters.

In accordance with this method, the quantization parameter estimator module 48 selects one of the multiple reference sets 62 of quantization values based on the preliminary quantization value estimates 47 that are determined by the distribution analyzer module 46 (block 102). Each of the reference sets 62 of quantization parameters corresponds to a set of quantization parameter values (also referred to as a "quantization matrix", "quantization table", or "quantization vector") that is commonly used to compress images. In some embodiments, these reference sets are identified by analyzing a large number of images that are compressed using the same block transform image compression format (e.g., JPEG) as the format that was used to compress the original image corresponding to the input image 42. In this process, the quantization vectors that were used to compress the images are extracted. The quantization vectors then are normalized (e.g., the quantization parameter values in each vector are scaled so that their sum is equal to unity). A vector quantization algorithm (e.g., the LBG (Linde Buzo Gray) vector quantization algorithm) is applied to the set of normalized quantization vectors to identify a small number (e.g., 5 or 6) of representative quantization vectors that are selected as the reference sets 62 of quantization parameters.

The selected reference set of quantization parameter values corresponds to the reference set 62 that best matches the set of preliminary estimates that was determined by the distribution analyzer module 46. In some implementations, an optimization process (e.g., a distance minimization process) is used to identify the reference set of quantization parameter values that is closest to the set of preliminary estimates.

After the reference set of quantization parameter values is selected (block 102), the quantization parameter estimator module 48 extrapolates estimates of values for the quantization parameters based on the selected reference set of quantization parameters (block 104). In this process, the quantization parameter estimator module 48 may scale the values in the selected reference set of quantization parameters to correspond to the values of the preliminary estimates 47 determined by the distribution analyzer module 46.

IV. CONCLUSION

The embodiments that are described above leverage an understanding of the clustering behavior of transform coefficient values derived from samples of image blocks to reduce the computational resources and memory resources that are needed to estimate quantization parameter values. In some implementations, these embodiments estimate quantization parameter values based on a relatively small sample of a population of image blocks that are divided from an image. In addition, some implementations are able to extrapolate quantization parameter values based on identification of a corresponding reference set of quantization parameter values. In this way, these implementations additionally reduce the required computational and memory resource requirements. Due to their efficient use of processing and memory resources, these embodiments readily may be implemented in application environments, such as embedded environments, which are subject to significant processing and memory constraints.

Other embodiments are within the scope of the claims.

What is claimed is:

1. A method of processing an input image that corresponds to a decompressed version of an image that was compressed based on quantization parameters with respective values, comprising:
    dividing the input image into a population of image blocks;
    generating frequency domain vectors from respective ones of the image blocks, wherein each of the frequency domain vectors comprises a respective set of values corresponding to a set of transform coefficients;
    determining preliminary estimates of respective ones of the quantization parameter values, wherein the determining comprises
        processing each of multiple of the frequency domain vectors in a respective iteration in a sequence of iterations, wherein the processing comprises determining the preliminary estimates from ones of the values in the multiple frequency domain vectors, and
        terminating the processing of the frequency domain vectors in response to a determination that a count of the determined preliminary estimates exceeds a first threshold that is less than a count of all the transform coefficients; and
    estimating values of the quantization parameters from the preliminary estimates;
    wherein the dividing, the generating, the determining, and the estimating are performed by computer hardware.

2. The method of claim 1, wherein the generating comprises sequentially generating the frequency domain vectors from a sequence of the image blocks.

3. The method of claim 2, wherein the determining comprises successively updating frequency distributions for respective ones of the transform coefficients with corresponding values in successive ones of the frequency domain vectors.

4. The method of claim 3, wherein the terminating comprises terminating the updating of a given one of the frequency distributions when a frequency of one of the transform coefficient values in the given frequency distribution exceeds a second threshold.

5. The method of claim 4, wherein the determining comprises respectively assigning to ones of the quantization parameters preliminary estimates corresponding to highest-frequency, non-zero ones of the values in the frequency distributions with respect to which the updating is terminated.

6. The method of claim 5, further comprising terminating the updating of the frequency distributions when a count of the quantization parameters assigned preliminary estimates exceeds the first threshold.

7. The method of claim 3, wherein each of the frequency distributions contains less than all values of the corresponding transform coefficients in a sample of the population of image blocks.

8. The method of claim 7, wherein each of the frequency distributions comprises a variable set of transform coefficient values.

9. The method of claim 8, further comprising determining the transform coefficient values in the variable set based on frequencies of the values in the successive ones of the frequency domain vectors.

10. The method of claim 9, wherein the determining comprises replacing transform coefficient values of lowest frequency with respective transform coefficient values in current ones of the successive frequency domain vectors but outside of the variable set.

11. The method of claim 7, wherein each of the frequency distributions comprises a fixed set of transform coefficient values near zero.

12. The method of claim 1, further comprising terminating the generating when a count of the determined preliminary estimates exceeds the first threshold.

13. The method of claim 12, wherein the estimating additionally comprises selecting one of multiple reference sets of quantization parameters values based on the preliminary quantization value estimates.

14. The method of claim 13, wherein the estimating additionally comprises extrapolating estimates of values for the quantization parameters based on the selected reference set of quantization parameter values.

15. A machine, comprising:
    a memory storing computer process instructions; and
    computer hardware coupled to the memory, operable to execute the instructions, and based at least in part on the execution of the instructions operable to perform operations comprising
    generating frequency domain vectors from respective one of image blocks in a population of image blocks divided from an input image that corresponds to a decompressed version of an image that was compressed based on quantization parameters with respective values, wherein each of the frequency domain vectors comprises a respective set of values corresponding to a set of transform coefficients;
    determining preliminary estimates of respective ones of the quantization parameter values, wherein the determining comprises
        processing each of multiple of the frequency domain vectors in a respective iteration in a sequence of iterations, wherein the processing comprises determining the preliminary estimates from ones of the values in the multiple frequency domain vectors, and
        terminating the processing of the frequency domain vectors in response to a determination that a count of the determined preliminary estimates exceeds a first threshold that is less than a count of all the transform coefficients; and
    estimating values of the quantization parameters from the preliminary estimates.

16. The machine of claim 15, wherein based at least in part on the execution of the instructions the computer hardware is operable to perform operations comprising sequentially generating the frequency domain vectors from a sequence of the image blocks.

17. The machine of claim 16, wherein based at least in part on the execution of the instructions the computer hardware is operable to perform operations comprising successively updating frequency distributions for respective ones of the transform coefficients with corresponding values in successive ones of the frequency domain vectors.

18. The machine of claim 17, herein based at least in part on the execution of the instructions the computer hardware is operable to perform operations comprising terminating the updating of a given one of the frequency distributions when a frequency of one of the transform coefficient values in the given frequency distribution exceeds a second threshold.

19. The machine of claim 18, wherein based at least in part on the execution of the instructions the computer hardware is operable to perform operations comprising respectively assigning to ones of the quantization parameters preliminary estimates corresponding to highest-frequency, non-zero ones of the values in the frequency distributions with respect to which the updating is terminated.

20. The machine of claim 19, wherein based at least in part on the execution of the instructions the computer hardware is operable to perform operations comprising terminating the updating of the frequency distributions when a count of the quantization parameters assigned preliminary estimates exceeds the first threshold.

21. The machine of claim 17, wherein based at least in part on the execution of the instructions the computer hardware is operable to perform operations comprising maintaining for each of the frequency distributions less than all values of the corresponding transform coefficients in a sample of the population of image blocks.

22. The machine of claim 21, wherein based at least in part on the execution of the instructions the computer hardware is operable to perform operations comprising maintaining for each of the frequency distributions a variable set of transform coefficient values.

23. The machine of claim 22, wherein based at least in part on the execution of the instructions the computer hardware is operable to perform operations comprising determining the transform coefficient values in the variable set based on frequencies of the values in the successive ones of the frequency domain vectors.

24. The machine of claim 23, wherein based at least in part on the execution of the instructions the computer hardware is operable to perform operations comprising replacing transform coefficient values of lowest frequency with respective transform coefficient value in current ones of the successive frequency domain vectors but outside of the variable set.

25. The machine of claim 21, wherein based at least in part on the execution of the instructions the computer hardware is operable to perform operations comprising maintaining for each of the frequency distributions a fixed set of transform coefficient values near zero.

26. The machine of claim 15, wherein based at least in part on the execution of the instructions the computer hardware is operable to perform operations comprising terminating the generation of the frequency domain vectors when a count of the determined preliminary estimates exceeds the first threshold.

27. The machine of claim 26, wherein based at least in part on the execution of the instructions the computer hardware is operable to perform operations comprising selecting one of multiple reference sets of quantization parameters values based on the preliminary quantization value estimates.

28. The machine of claim 27, wherein based at least in part on the execution of the instructions the computer hardware is operable to perform operations comprising extrapolating estimates of values for the quantization parameters based on the selected reference set of quantization parameter values.

29. A computer-readable medium storing computer-readable instructions which, when executed by a computer, cause the computer to perform operations comprising:
dividing an input image into a population of image blocks, wherein the input image corresponds to a decompressed version of an image that was compressed based on quantization parameters with respective values;
generating frequency domain vectors from respective ones of the image blocks, wherein each of the frequency domain vectors comprises a respective set of values corresponding to a set of transform coefficients;
determining preliminary estimates of respective ones of the quantization parameter values, wherein the determining comprises
processing each of multiple of the frequency domain vectors in a respective iteration in a sequence of iterations, wherein the processing comprises determining the preliminary estimates from ones of the values in the multiple frequency domain vectors, and
terminating the processing of the frequency domain vectors in response to a determination that a count of the determined preliminary estimates exceeds a threshold that is less than a count of all the transform coefficients; and
estimating values of the quantization parameters from the preliminary estimates.

30. A system for processing an input image that corresponds to a decompressed version of an image that was compressed based on quantization parameters with respective values, comprising:
means for dividing the input image into a population of image blocks;
means for generating frequency domain vectors from respective ones of the image blocks, wherein each of the frequency domain vectors comprises a respective set of values corresponding to a set of transform coefficients;
means for determining preliminary estimates of respective ones of the quantization parameter values, wherein the means for determining performs operations comprising
processing each of multiple of the frequency domain vectors in a respective iteration in a sequence of iterations, wherein the processing comprises determining the preliminary estimates from ones of the values in the multiple frequency domain vectors, and
terminating the processing of the frequency domain vectors in response to a determination that a count of the determined preliminary estimates exceeds a threshold that is less than a count of all the transform coefficients; and
means for estimating values of the quantization parameters from the preliminary estimates.

31. The method of claim 1, further comprising processing the input image based on the estimated values of the quantization parameters.

32. The method of claim 1, further comprising storing the estimated values of the quantization parameters in one or more computer-readable media.

33. The method of claim 1, further comprising producing a different version of the input image based on the estimated values of the quantization parameters.

34. The method of claim 1, wherein during each current one of the iterations, the processing comprises for each of the transform coefficients,
ascertaining a respective frequency distribution of most-frequently occurring ones of the values in the frequency domain vector being processed in the current iteration and all the frequency domain vectors that have been processed in respective ones of the iterations preceding the current iteration, and
in response to a determination that a most-frequent one of the values in the ascertained frequency distribution has a respective frequency that exceeds a second threshold, selecting the most-frequent value as a respective one of the preliminary estimates.

* * * * *

UNITED STATES PATENT AND TRADEMARK OFFICE
CERTIFICATE OF CORRECTION

PATENT NO.        : 7,684,632 B2
APPLICATION NO.   : 11/129924
DATED             : March 23, 2010
INVENTOR(S)       : Ramin Samadani It is certified that error appears in the above-identified patent and that said Letters Patent is hereby corrected as shown below:

In column 12, line 25, in Claim 15, delete "one" and insert -- ones --, therefor.

In column 12, line 59, in Claim 18, delete "herein" and insert -- wherein --, therefor.

Signed and Sealed this
Twenty-seventh Day of November, 2012

David J. Kappos
*Director of the United States Patent and Trademark Office*